US012710830B2

(12) United States Patent
Liu

(10) Patent No.: US 12,710,830 B2
(45) Date of Patent: Aug. 18, 2026

(54) KEYBOARD LETTER AREA LAYOUT METHOD

(71) Applicant: Qimin Liu, Wuhan (CN)

(72) Inventor: Qimin Liu, Wuhan (CN)

(73) Assignee: Qimin Liu, Wuhan (CN)

( * ) Notice: Subject to any disclaimer, the term of this patent is extended or adjusted under 35 U.S.C. 154(b) by 0 days.

(21) Appl. No.: 18/940,755

(22) Filed: Nov. 7, 2024

(65) Prior Publication Data

US 2025/0068256 A1 Feb. 27, 2025

Related U.S. Application Data

(63) Continuation of application No. PCT/CN2023/092125, filed on May 5, 2023.

(30) Foreign Application Priority Data

May 7, 2022 (CN) ........................ 202210492235.1

(51) Int. Cl.
*G06F 3/02* (2006.01)

(52) U.S. Cl.
CPC ................................ *G06F 3/0219* (2013.01)

(58) Field of Classification Search
CPC ... G06F 3/0219; G06F 3/0233; G06F 3/04886
See application file for complete search history.

(56) References Cited

U.S. PATENT DOCUMENTS

2004/0164964 A1* 8/2004 Sokolowski .......... G06F 3/0219 345/168
2012/0242583 A1 9/2012 Moelgaard
2019/0187891 A1* 6/2019 Davis ................. G06F 3/04886

FOREIGN PATENT DOCUMENTS

CN 1581042 A 2/2005
CN 103488426 A 1/2014
CN 104503598 A 4/2015
CN 114895797 A 8/2022

OTHER PUBLICATIONS

International Search Report of PCT/CN2023/092125(Sep. 2023).

* cited by examiner

*Primary Examiner* — Priyank J Shah
(74) *Attorney, Agent, or Firm* — JEEN IP LAW, LLC

(57) ABSTRACT

This invention relates to a keyboard letter zone layout method, specifically designed for physical and on-screen keyboards used for data input on devices such as mobile phones, tablets, and computers. The layout includes 26 letter keys (A, B, C, D . . . E, F, G) and serves as an input method for hardware or electronic device software. The keyboard letter zone is divided into 8 regions based on the rhythm of the alphabet song, with each region corresponding to a segment of the song's rhythm and containing multiple keys. By utilizing the popular rhythm of the alphabet song, this layout makes it intuitive to remember letter positions, allowing users to locate each letter on the keyboard quickly without needing intensive learning. With a short period of practice, users can achieve proficient touch typing with both hands.

10 Claims, 13 Drawing Sheets

FIG. 2
C
C
A B C D
E F G
3 G7
C
H I J K
L M N O P
5 C
C
Q R S
T U V
7 C
C
Dou - ble - u X
Y and Z.

KEYBOARD LETTER AREA LAYOUT METHOD

RELATED APPLICATIONS

The present patent document is a continuation of PCT Application Serial No. PCT/CN2023/092125, filed May 5, 2023, designating the United States and published in English, which is hereby incorporated by reference.

The present patent document claims the benefit of priority to patent application No. 202210492235.1, filed May 7, 2022, and entitled "KEYBOARD LETTER AREA LAYOUT METHOD," the entire contents of each of which are incorporated herein by reference.

BACKGROUND

1. Technical Field

This invention pertains to the input of information using a keyboard, presenting a method for the layout of keyboard letters.

2. Background Information

The QWERTY keyboard is the most commonly used keyboard globally for mobile phones, tablets, and computers. Its name comes from the first six letters on the top row of the letter area. It originated from the Sholes and Glidden Typewriter, with the drawback of an irregular letter arrangement that requires a long familiarization period and has a high learning cost.

U.S. Pat. No. 2,040,248A discloses a keyboard layout designed to balance the workload between the right and left hands, maximizing the load on the middle row and alternating hand sequences to increase input speed. However, its drawback is that it is not suitable for everyday keyboard use and is difficult to memorize.

Patent CN103995603A discloses a keyboard layout designed based on the characteristics of Chinese characters to improve input efficiency and reduce the learning cost of keyboards. Its limitation is that it only enhances Chinese character input efficiency without addressing ease of memorization.

U.S. Pat. Nos. 5,584,588A and 4,615,629 disclose a keyboard layout based on alphabetical order, but its drawback is that it lacks user-friendliness, making it challenging for human memory retention.

BRIEF SUMMARY

To address the aforementioned issue, this invention presents a method for the layout of the keyboard letter area based on the widely popular alphabet song. The layout of the keyboard letter area designed based on this method can assist users in familiarizing themselves with the keyboard through the melody of music. Without the need for formal study, users can swiftly locate each letter on the keyboard. With a brief period of training, users can achieve touch typing with both hands.

In terms of the keyboard letter area layout, it comprises hardware or software keyboards consisting of 26 letter keys labeled A, B, C, D, E, F, G . . . . The keyboard layout is segmented into multiple zones based on the rhythm of the "Alphabet Song," with each zone corresponding to a segment of the song's beat. Each zone contains a set number of key positions, with each position accommodating at most one letter, or none at all.

Further, the keyboard letter layout is based on eight-beat patterns from three different "Alphabet Song" variations. The eight beats of the first version are: ABCD, EFG, HIJK, LMNOP, QRS, TUV, WX, YZ; the second version's beats are: ABCD, EFG, HIJK, LMN, OPQ, RST, UVW, XYZ; and the third version's beats are: ABCD, EFG, HIJK, LMN, OPQR, STU, VWX, YZ. These rhythms divide the letter area into eight zones arranged in specific patterns, where each zone has a number of key positions according to the respective "Alphabet Song" version, with each zone containing at least as many positions as letters in the corresponding song segment.

Additionally, in the layout, the first beat corresponds to four key positions, the second to three, the third to four, the fourth to five, the fifth to four, the sixth to three, the seventh to three, and the eighth to three. Within each zone, the keys are arranged alphabetically, with no restrictions on the overall left-right or up-down positioning of letters. Keys (1, 2, 3, 4) are arranged as A, B, C, D; keys (5, 6, 7) as E, F, G; and keys (8, 9, 10, 11) as H, I, J, K.

For different "Alphabet Song" rhythms, the layout includes keys (26, 12, 13, 14, 28) arranged as L, M, N, O, P; keys (15, 16, 17, 18) contain Q, R, S, blank; keys (19, 20, 21) are T, U, V; and keys (22, 23, 24) include W, blank, X, while keys (25, 27) are arranged as Y, Z. Blank spaces within the letter zones can hold any character and are freely placeable, not affecting the character sequence within the zone.

In another variation, the layout uses keys (12, 13, 14, 28) with characters L, M, N, blank; keys (15, 16, 17, 18) contain O, P, Q, blank; keys (19, 20, 21) as R, S, T; and keys (22, 23, 24) as U, V, W. This arrangement divides the letter area into eight regions in a three-row layout with nine key positions in the first row, ten in the second, and nine in the third. Based on the "Alphabet Song" beats, the zones are set up with the first four keys (1, 2, 3, 4) as Zone 1, the next three (5, 6, 7) as Zone 2, and so on, following the song's rhythm.

Compared to existing keyboard layouts, this invention has several advantages, including improved input efficiency and ease of memorizing letter positions. By aligning the letter area with the rhythm of the popular "Alphabet Song," users can remember letter positions easily. The design enables users to quickly find letters on the keyboard and achieve touch typing with both hands after minimal training.

DETAILED DESCRIPTION OF THE DRAWINGS AND THE PRESENTLY PREFERRED EMBODIMENTS

Figure 1:
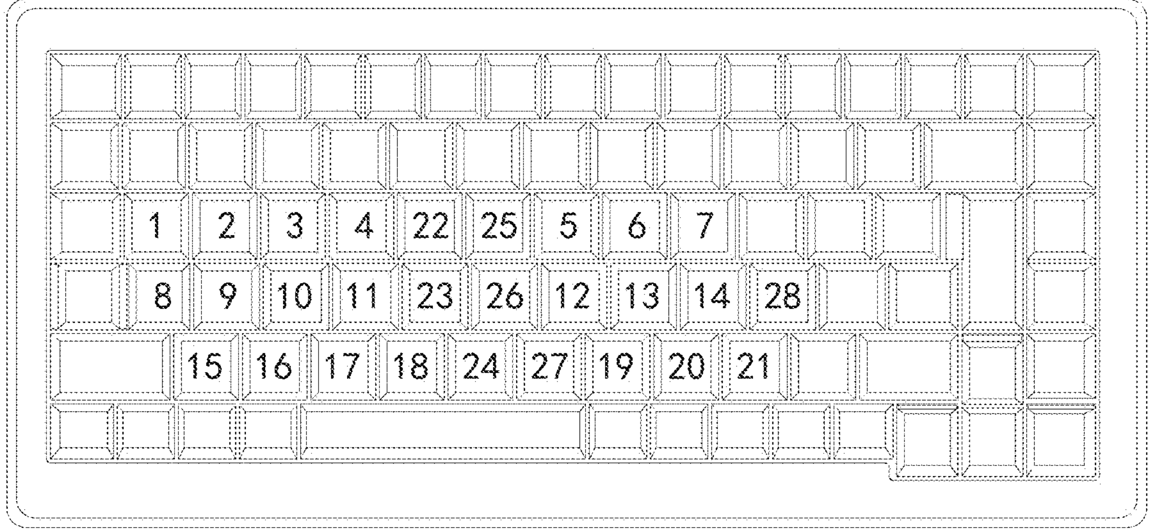
FIG. 1: Schematic diagram of numerical numbering in the keyboard letter zone.

As shown in FIG. 1, the letter zone of the keyboard consists of 28 keys numbered 1-28. Each letter corresponds to one number from 1 to 28, with each number being assigned a maximum of one letter or no letter.

Figure 2:
FIG. 2: Schematic diagram of the rhythm for the first alphabet song.
Figure 3:
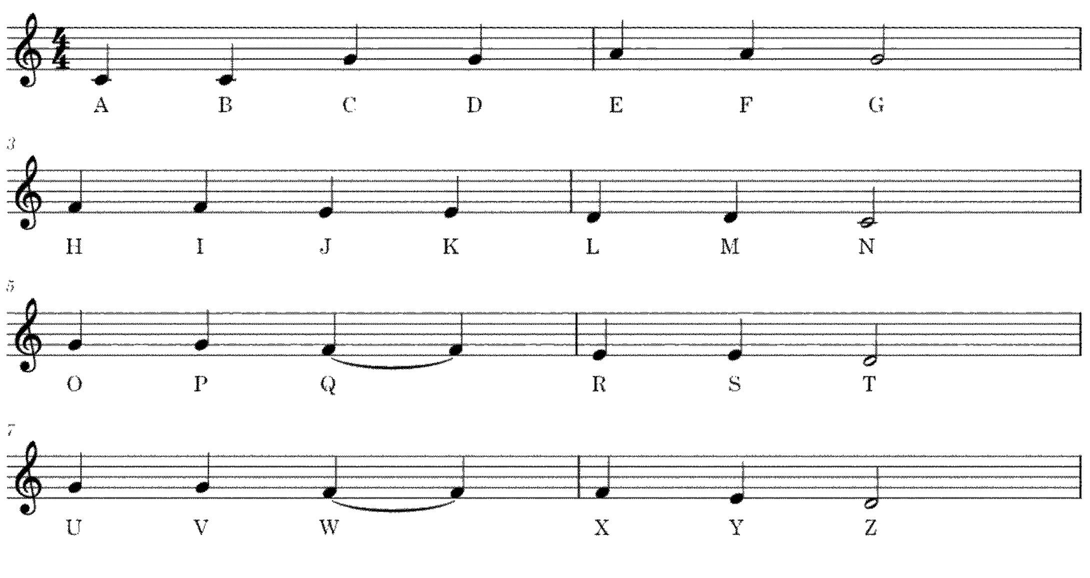
FIG. 3: Schematic diagram of the rhythm for the second alphabet song.
Figure 4:
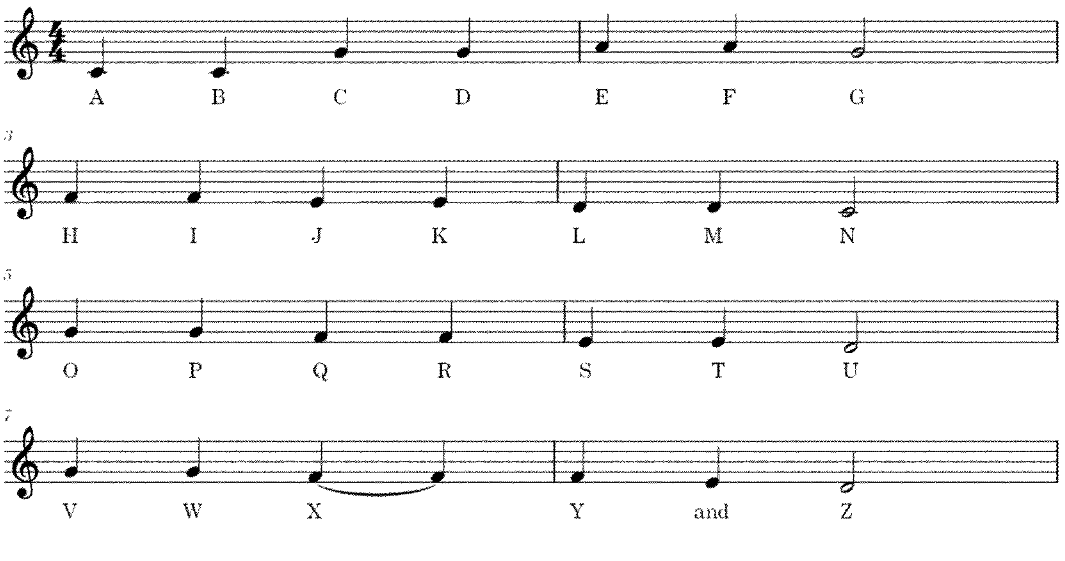
FIG. 4: Schematic diagram of the rhythm for the third alphabet song.

FIGS. 2, 3, and 4 illustrate the rhythmic breakdowns of three versions of the alphabet song;

FIG. 2: First version rhythm: ABCD, EFG, HIJK, LMNOP, QRS, TUV, WX, YZ.

FIG. 3: Second version rhythm: ABCD, EFG, HIJK, LMN, OPQ, RST, UVW, XYZ.

FIG. 4: Third version rhythm: ABCD, EFG, HIJK, LMN, OPQR, STU, VWX, YZ.

The keyboard arrangement applies to input devices on hardware or electronic software. The letter zone layout is segmented by alphabet song rhythms, with each section of the rhythm corresponding to a group of keys that contain at most one letter per key, or may include blank keys.

Figure 5:
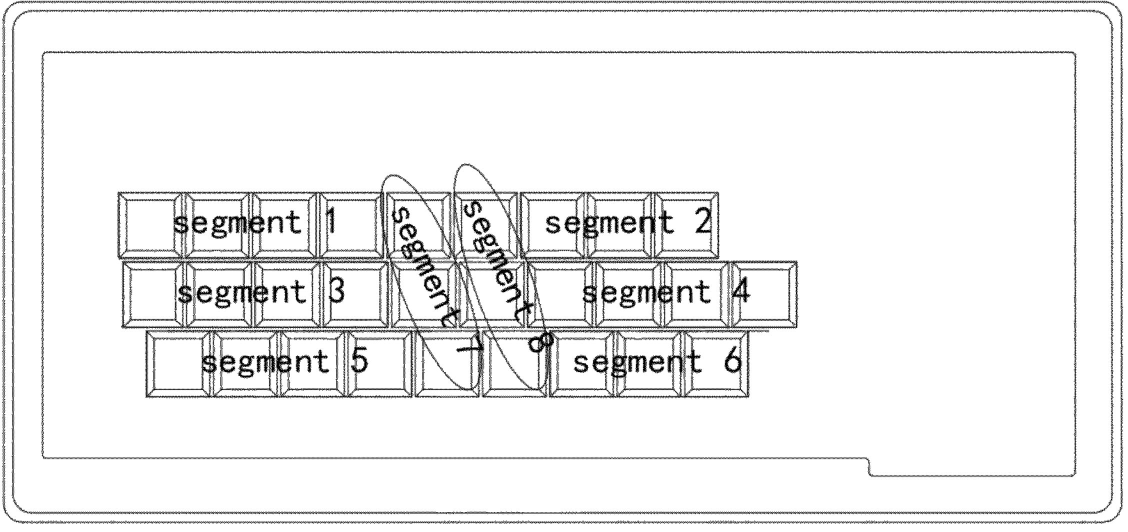
FIG. 5: Schematic diagram showing the three types of keyboard segmentation.

FIG. 5 demonstrates the keyboard segmentation based on the three alphabet song versions. The letter zone is divided into eight segments according to the rhythm of the alphabet song. These segments can be arranged in a typical horizontal or vertical orientation or a combination of both. Each segment contains a number of keys that meet or exceed the number of letters in each rhythm segment.

Figure 6:
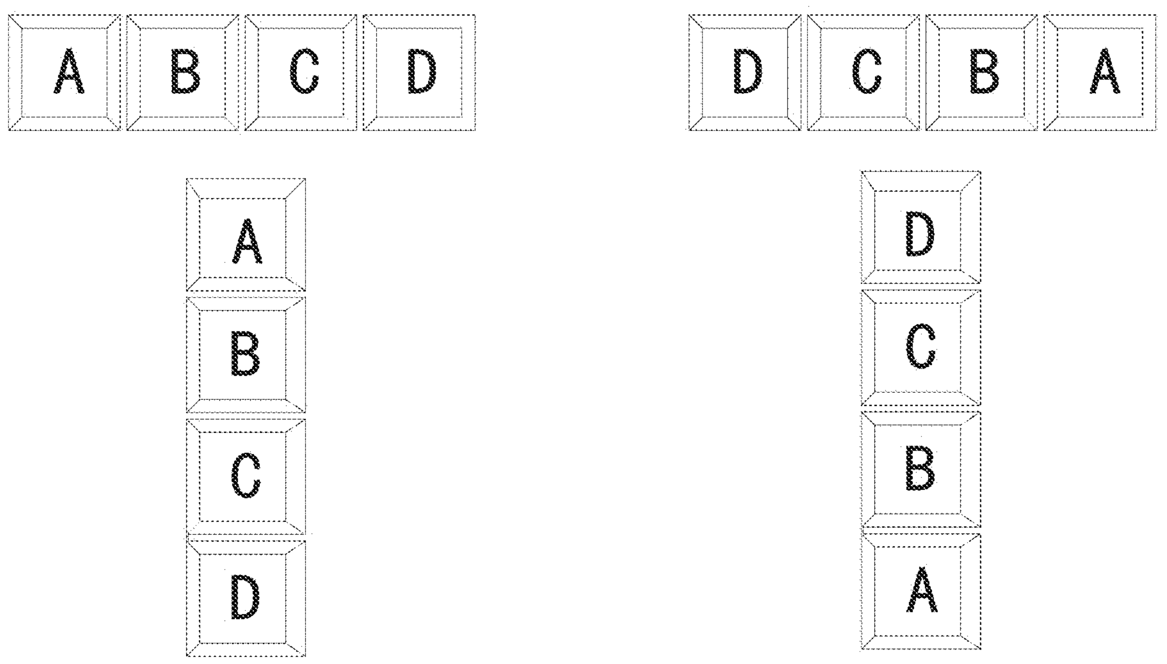
FIG. 6: Schematic diagram of the two types of key arrangements.
Figure 7:
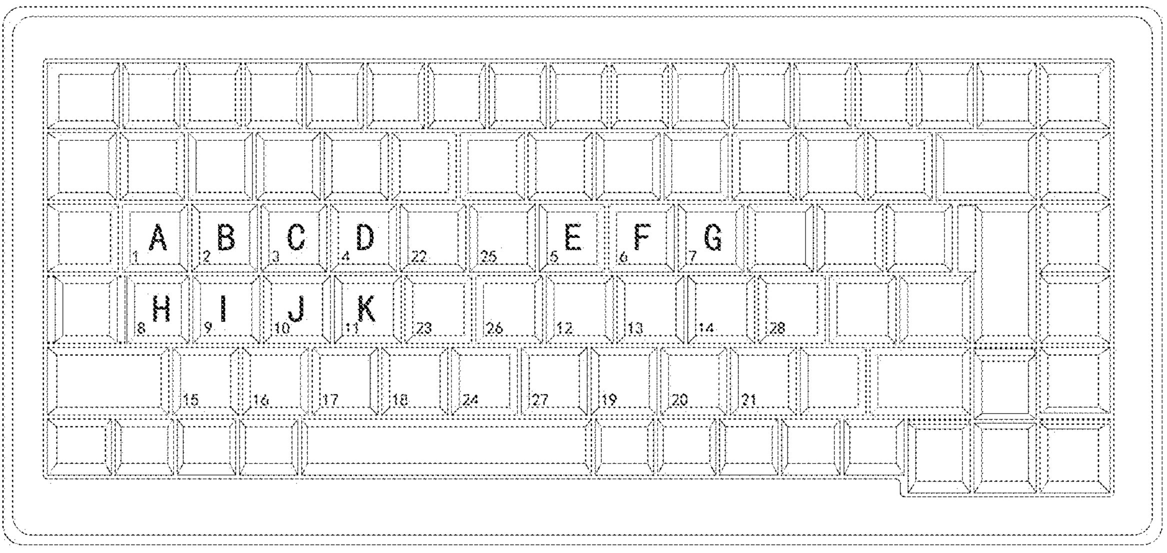
FIG. 7: Diagram of the letter arrangement for the first three segments in the universal keyboard layout method.
Figure 8:
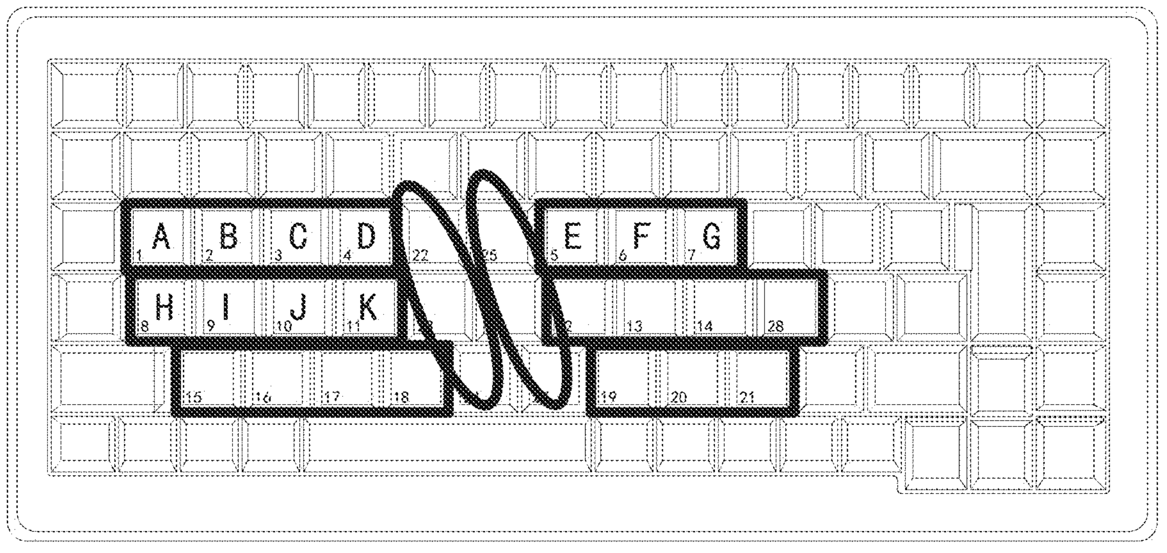
FIG. 8: Schematic diagram of the keyboard segmented by rows.

The number of keys per rhythm segment in FIG. 5 is:

First rhythm segment: 4 keys
Second rhythm segment: 3 keys
Third rhythm segment: 4 keys
Fourth rhythm segment: 5 keys
Fifth rhythm segment: 4 keys
Sixth rhythm segment: 3 keys
Seventh rhythm segment: 3 keys
Eighth rhythm segment: 3 keys FIG. 6 shows the alphabetical arrangement within each segment, which can be oriented in any direction. The sequence can run left-to-right (e.g., A, B, C, D), right-to-left (D, C, B, A), top-to-bottom, or bottom-to-top. FIG. 7 illustrates the letter arrangement for the first three segments:

Keys 1, 2, 3, 4 contain A, B, C, D
Keys 5, 6, 7 contain E, F, G
Keys 8, 9, 10, 11 contain H, I, J, K FIG. 8 provides a row-based keyboard segmentation, dividing the letter zone into three rows with eight segments:

Row 1: Segment 1 (keys 1, 2, 3, 4) and Segment 2 (keys 5, 6, 7)
Row 2: Segment 3 (keys 8, 9, 10, 11) and Segment 4 (keys 12, 13, 14, 28)
Row 3: Segment 5 (keys 15, 16, 17, 18) and Segment 6 (keys 19, 20, 21)
Segment 7 includes keys 22, 23, 24 in all rows; Segment 8 includes keys 25, 26, 27 in all rows.

Figure 9:
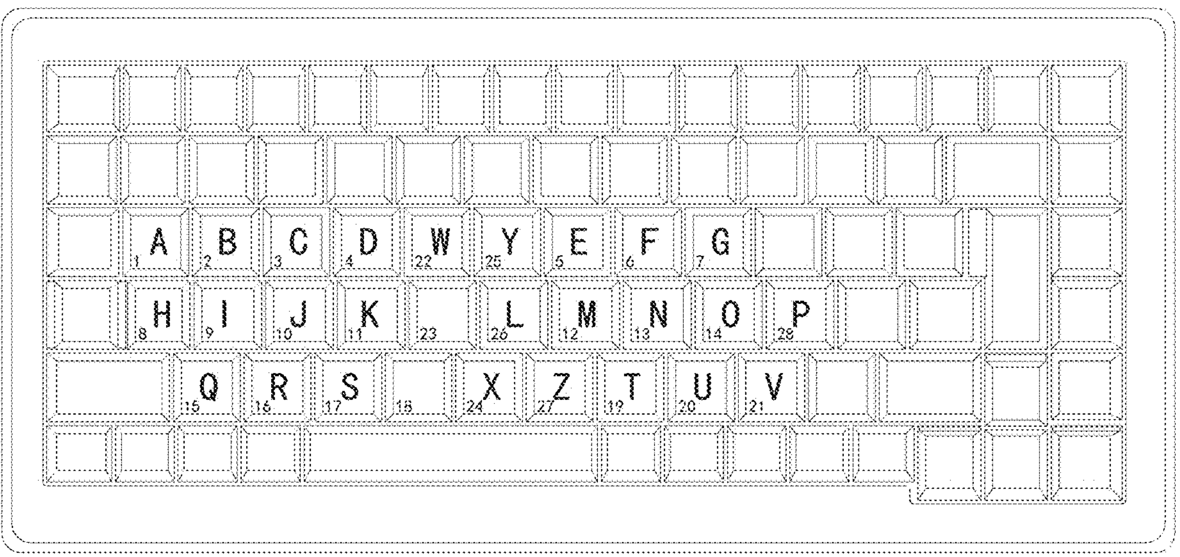
FIG. 9: Implementation example of a keyboard layout segmented by rows based on the rhythm of the first alphabet song.
Figure 10:
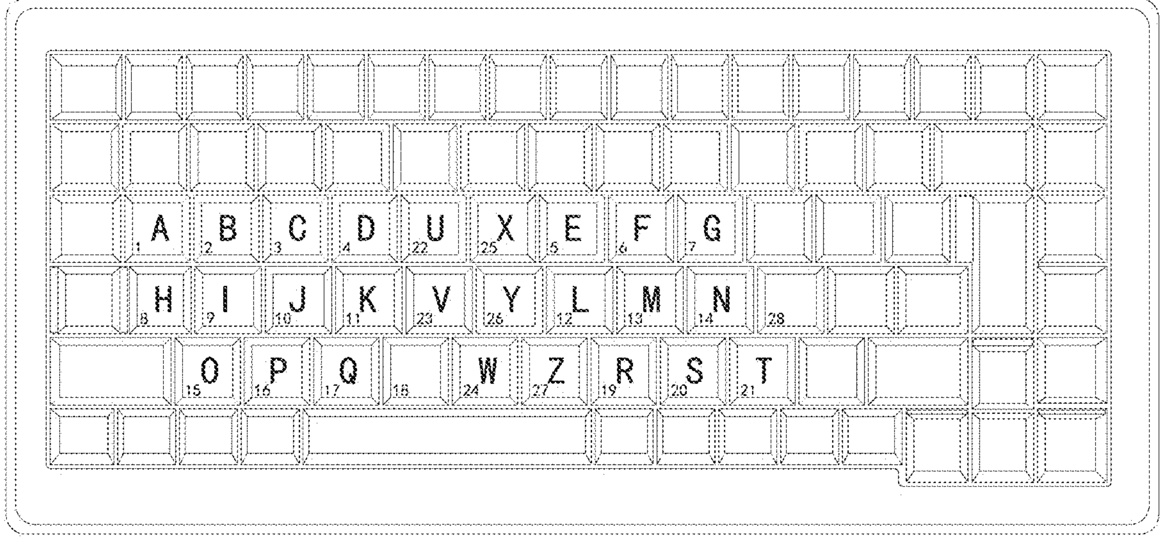
FIG. 10: Implementation example of a keyboard layout segmented by rows based on the rhythm of the second alphabet song.
Figure 11:
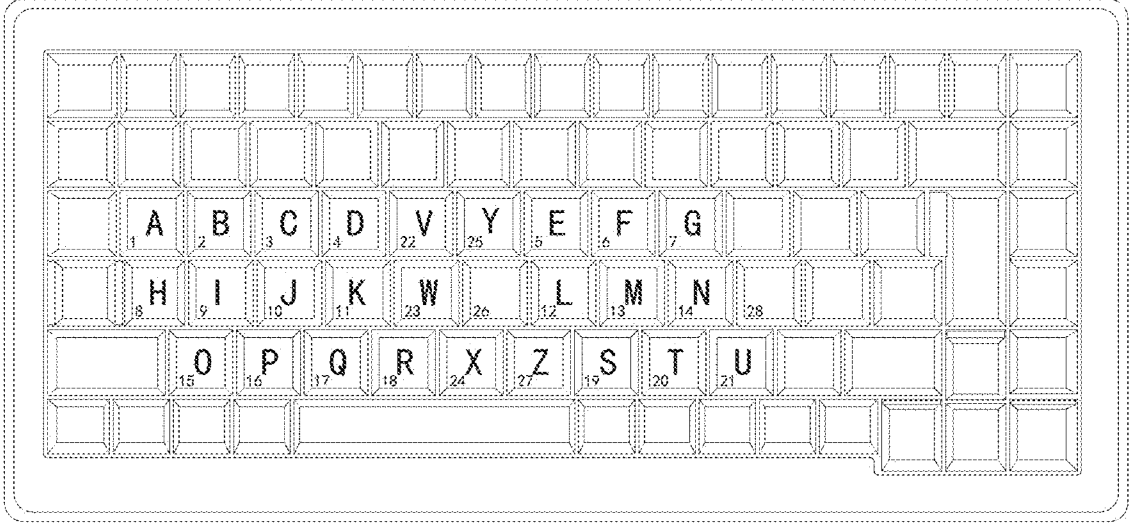
FIG. 11: Implementation example of a keyboard layout segmented by rows based on the rhythm of the third alphabet song.

FIGS. 9-11 provide examples of keyboard layouts based on each alphabet song rhythm, arranged in rows:

FIG. 9: Layout based on the first rhythm, with keys 1-4 in Segment 1 (A, B, C, D), keys 5-7 in Segment 2 (E, F, G), and so on.

FIG. 10: Layout based on the second rhythm, with each segment arranged similarly and blank spaces that do not disrupt the sequence.

FIG. 11: Layout based on the third rhythm, with an arrangement that places blank spaces in each segment as necessary.

Figure 12:
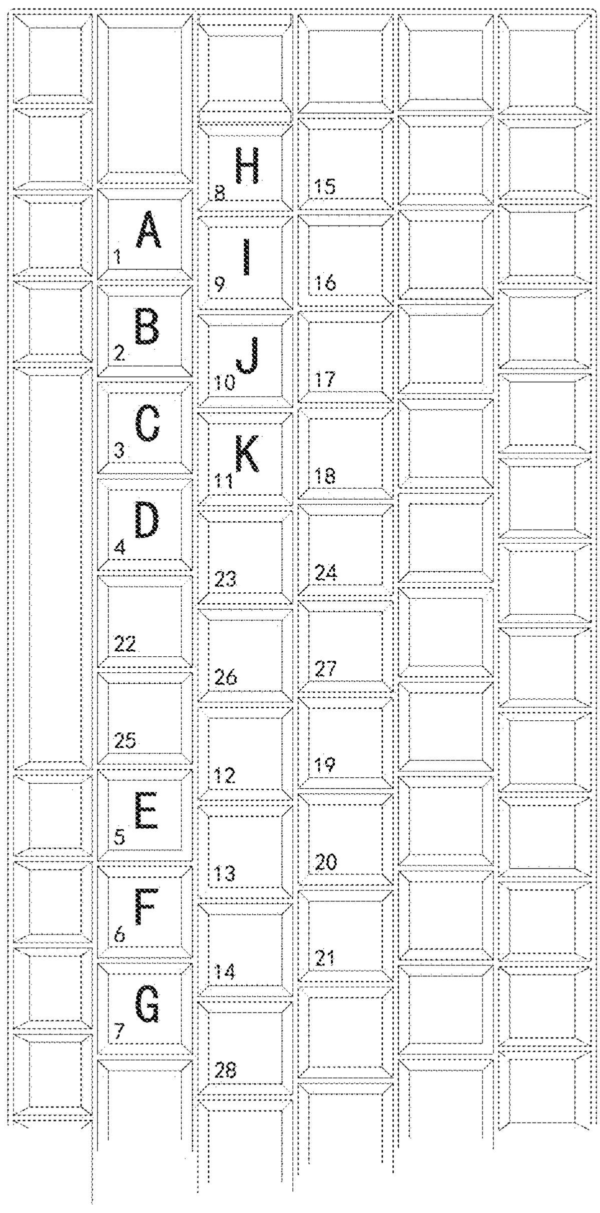
FIG. 12: Schematic diagram of the keyboard segmented by columns.

FIG. 12 shows the column-based layout where the letter zone is divided into three columns, with eight segments arranged in columns:

Column 1 contains Segments 1 and 2
Column 2 contains Segments 3 and 4
Column 3 contains Segments 5 and 6
Segments 7 and 8 span all three columns.

Figure 13:
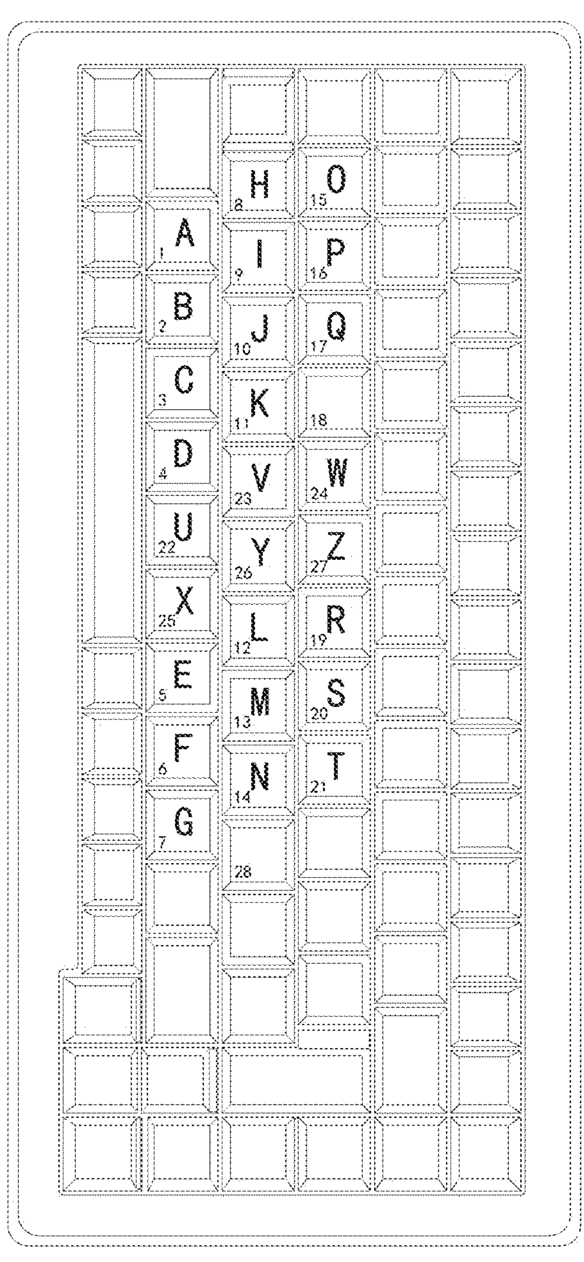
FIG. 13: Implementation example of a keyboard layout segmented by columns based on the rhythm of the second alphabet song.

FIG. 13 illustrates an example layout based on one of the rhythmic versions. For instance, Segment 4 (keys 12, 13, 14, 28) contains L, M, N, and blank, Segment 5 (keys 15, 16, 17, 18) contains O, P, Q, blank, and so on.

The invention claimed is:

1. A keyboard alphabetical area layout method, comprising: dividing an alphabetical area of a keyboard into eight letter zones according to rhythm segments of the alphabet song; arranging six of the eight letter zones as horizontally oriented zones corresponding to first through sixth rhythmic segments of the alphabet song;

wherein the two vertically oriented zones are positioned between the horizontally oriented zones so as to form a structural visual divider separating the horizontally oriented zones into left and right groups;

wherein each letter zone contains a number of keys equal to or greater than the number of letters in its corresponding rhythmic segment, each key holding at most one letter or a blank;

and wherein the vertically oriented zones are not configured as frequency-prioritized letter groups, but are configured to provide rhythmic and spatial memory cues corresponding to the alphabet song.

2. The keyboard alphabetical area layout method described in claim 1, wherein the alphabet song is selected from a closed set of alphabet songs each having eight rhythmic segments, including:

Song 1: ABCD, EFG, HIJK, LMNOP, QRS, TUV, WX, YZ;

Song 2: ABCD, EFG, HIJK, LMN, OPQ, RST, UVW, XYZ; and

Song 3: ABCD, EFG, HIJK, LMN, OPQR, STU, VWX, YZ.

3. The keyboard alphabetical area layout method described in claim 1 wherein the two vertically oriented zones correspond to the last two rhythmic segments of the alphabet song.

4. The keyboard alphabetical area layout described in claim 1, wherein each letter zone contains at least as many keys as letters in its corresponding rhythmic segment.

5. The keyboard alphabetical area layout method described in claim 2, the keys within each zone are arranged in alphabetical order without restriction on the overall directional orientation (up, down, left, or right) of the letter combinations; the character order for keys (1, 2, 3, 4) is A, B, C, D; for keys (5, 6, 7) is E, F, G; and for keys (8, 9, 10, 11) is H, I, J, K.

6. The keyboard alphabetical area layout method described in claim 5, based on the layout of different alphabet song rhythms, the character order for keys (26, 12, 13, 14, 28) is L, M, N, O, P; for keys (15, 16, 17, 18) includes Q, R, S, and a blank; for keys (19, 20, 21), the character order is T, U, V; for keys (22, 23, 24) includes W, a blank, and X; and for keys (25, 27), the character order is Y, Z; blank positions in the alphabetical area may hold any character, can be placed anywhere within the zone, and do not affect the sequential order of characters within the zone.

7. The keyboard alphabetical area layout method described in claim 5, based on the layout of different alphabet song rhythms, the characters for keys (12, 13, 14, 28) include L, M, N, and a blank; for keys (15, 16, 17, 18) include O, P, Q, and a blank; the character order for keys (19, 20, 21) is R, S, T; for keys (22, 23, 24) is U, V, W; and for keys (25, 26, 27) is X, Y, Z; blank positions in the alphabetical area may hold any character, can be placed anywhere within the zone, and do not affect the sequential order of characters within the zone.

8. The keyboard alphabetical area layout method described in claim 5, based on the layout of different alphabet song rhythms, the characters for keys (12, 13, 14, 28) include L, M, N, and a blank; the character order for keys (15, 16, 17, 18) is O, P, Q, R; for keys (19, 20, 21) is S, T, U; for keys (22, 23, 24) is V, W, X; and for keys (25, 26, 27) includes Y, a blank, and Z; blank positions in the alphabetical area may hold any character, can be placed anywhere within the zone, and do not affect the sequential order of characters within the zone.

9. The keyboard alphabetical area layout method according to claim 1, wherein the alphabetical area is arranged into three rows having nine, ten, and nine key positions respectively, and wherein specific key positions in each row are grouped to form the eight letter zones according to their corresponding rhythmic segments, as defined by fixed positional relationships between rows and columns.

10. The keyboard alphabetical area layout method according to claim 1, wherein each vertically oriented zone has a primary longitudinal axis that is substantially vertical, including arrangements in which keys within the vertically oriented zone are offset, stepped, or staggered along a vertical direction while maintaining an overall vertical alignment of the zone.

* * * * *